(12) United States Patent
Park et al.

(10) Patent No.: US 7,027,421 B2
(45) Date of Patent: Apr. 11, 2006

(54) METHOD AND APPARATUS FOR SEARCHER BEAMFORMING IN CDMA BASE STATION SYSTEM USING ARRAY ANTENNA

(75) Inventors: Hyung Gun Park, Taejon (KR); Mun Geon Kyeong, Taejon (KR); Hyun Seo Oh, Taejon (KR); Kyung Hi Chang, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 1054 days.

(21) Appl. No.: 09/975,152

(22) Filed: Oct. 12, 2001

(65) Prior Publication Data

US 2002/0057660 A1 May 16, 2002

(30) Foreign Application Priority Data

Oct. 12, 2000 (KR) ............................... 2000-59981

(51) Int. Cl.
*H04B 7/216* (2006.01)
(52) U.S. Cl. ...................... 370/335; 370/342; 370/441; 370/339; 455/561; 455/562.1; 375/130; 375/148
(58) Field of Classification Search ................ None
See application file for complete search history.

(56) References Cited

U.S. PATENT DOCUMENTS

| | | | |
|---|---|---|---|
| 5,892,700 A * | 4/1999 | Haardt | .................. 708/801 |
| 6,021,334 A | 2/2000 | Aste et al. | |
| 6,064,338 A | 5/2000 | Kobayakawa et al. | |
| 6,091,788 A | 7/2000 | Keskitalo et al. | |
| 6,108,565 A | 8/2000 | Scherzer | |
| 6,226,531 B1 * | 5/2001 | Holt et al. | ............... 455/562.1 |
| 6,347,234 B1 * | 2/2002 | Scherzer | .................. 455/562.1 |

OTHER PUBLICATIONS

Goldberg & Fonollosa; *Downlink Beamforming for Cellular Mobile Communications;* 1997 IEEE; pp. 632-636.
Tanaka et al.; *Pilot symbol-Assited Decision-Directed Coherent Adaptive Array Diversity for DS-CDMA Mobile Radio Reverse Link;* IEICE Trans Fundamentals vol. E80-A No. 12 Dec. 1997; pp. 2445-2453.

* cited by examiner

*Primary Examiner*—Bob Phunkulh
*Assistant Examiner*—Robert W. Wilson
(74) *Attorney, Agent, or Firm*—Mayer, Brown, Rowe & Maw LLP (57) ABSTRACT

This invention relates to a method and apparatus for increasing the performance of searcher by using the array antenna when the signal to interference plus noise ratio is low. The two-dimensional searcher performs the spatial-filtering to reduce the noise and interference components and then correlates the spatial-filtered signal with a pseudo noise (PN) code to thereby detect the incoming signals and acquire the corresponding code timings. Furthermore, the two-dimensional searcher can be used to increase the performance of a finger beamformer in two ways. One is to use searcher beamforming weight as initial finger beamforming weight to increase the convergence speed in the adaptive beamforming algorithms. The other is to reduce an amount of computation in the angle of arrival estimation algorithms by calculating the azimuth power spectrum only for the specific angle range.

9 Claims, 6 Drawing Sheets

METHOD AND APPARATUS FOR SEARCHER BEAMFORMING IN CDMA BASE STATION SYSTEM USING ARRAY ANTENNA

FIELD OF THE INVENTION

The present invention relates to a CDMA base station system; and, more particularly, to a two-dimensional searcher incorporated with a beamforming network coupled to a one-dimensional searcher in which the beamforming network forms an antenna beam whose beamwidth is narrower than an angle corresponding to one sector.

DESCRIPTION OF THE PRIOR ART

A code division multiple access (CDMA) base station system requires a pseudo noise (PN) code timing in order to demodulate a received signal. When a terminal initially accesses to a base station, the base station covering the terminal analyzes a CDMA signal transmitted from the terminal and adjusts the PN code timing of the terminal. This is called an initial code timing acquisition and an apparatus for acquiring the initial code timing acquisition is a searcher. Also, the searcher performs a multipath searching function for searching multipaths that occur according to the movement of the terminal and acquiring code timing of a corresponding signal.

In a conventional CDMA base station system, a data received through an antenna whose beamwidth covers one sector entirely is correlated with the PN code, thereby acquiring the code timing. However, in case that a noise component in the received signal is increased or an interference component thereof is increased due to the increase of the base station capacity, it is difficult to acquire code timing stably.

After the searcher acquires the code timing, the code timing information is allocated to finger. Using the allocated code timing information, the finger tracks the PN code timing and demodulates the data. The CDMA base station system that uses the array antenna allocates a beamformer (hereinafter, referred to as a finger beamformer) in order to increase a signal to interference plus noise ratio for each finger signal. The finger beamformer requires PN code timing information to estimate an arrival angle of corresponding multipath signals or to calculate an optimum beamforming weight by using adaptive signal processing algorithms. Accordingly, it takes a predetermined time for the finger beamformer to output the calculated optimum beamforming weight after the searcher completes the code timing acquisition. As a result, there is a problem that the finger beamforming is not achieved during that period and hence the initial bit error rate is high, which degrades the performance of the adaptive beamforming algorithms using a decision-directed bit for a beamforming reference signal.

In case that the adaptive signal processing algorithm that converges from an initial beamforming weight to an optimum beamforming weight is used, since the adaptive signal processing algorithm does not have any information on the initial weight, a convergence speed is slow.

Additionally, in case of an algorithm for computing the azimuth power spectrum of the received signal and estimating the angle of arrival, the azimuth power spectrum should be computed for all angles of the entire sector.

SUMMARY OF THE INVENTION

It is, therefore, an object of the present invention to provide a two-dimensional searcher for acquiring code timing information and the range of signal arrival angles, wherein the two-dimensional searcher includes a beamforming network, coupled to a one-dimensional searcher, for forming an antenna beam whose beamwidth is narrower than an angle corresponding to a sector.

In accordance with an aspect of the present invention, there is provided a code division multiple access (CDMA) base station system, comprising: an array antenna receiving a signal; a multi-channel down-conversion unit for down-converting the signal received through the array antenna to generate a digital signal; a calibration unit for injecting an RF reference signal into the multi-channel down-conversion unit to generate a baseband digital reference signal, analyzing the baseband digital reference signal to estimate a transfer function of the multi-channel down-conversion unit and correcting an error of the transfer function of multi-channel down-conversion unit; a two-dimensional searching unit for spatial-filtering the digital signal to generate a spatial-filtered signal and correlating the spatial-filtered digital signal with a pseudo noise (PN) to thereby detect the signal and acquire corresponding code timings; and an adaptive array demodulation unit for performing a beamforming operation and demodulating received data through a despreader and a rake receiver.

In accordance with another aspect of the present invention, there is provided a method for acquiring a code timing by using a two-dimensional searcher in a code division multiple access (CDMA) base station system using an array antenna, comprising the steps of: a) down-converting a signal received through an array antenna to generate a digital signal; b) injecting an RF reference signal into a multi-channel down-conversion unit and to generate a baseband digital reference signal and analyzing the baseband digital reference signal to estimate a transfer function of the multi-channel down-conversion unit; c) correcting an error of the transfer function of multi-channel down-conversion unit based on the transfer function estimate obtained at step b); d) dividing a sector into a plurality of the subsectors; e) spatial-filtering the digital signal using a beamforming weight to thereby generate a spatial-filtered digital signal; f) correlating the spatial-filtered digital signal with a PN code to thereby detect the signal and acquire code timings of the detected signal; and g) putting together the code timings for all the subsectors to acquire the code timings for an entire sector.

In accordance with further another aspect of the present invention, there is provided a method for estimating a range of a signal arrival angle using a two-dimensional searcher in a code division multiple access (CDMA) base station system having an array antenna, comprising the steps of: a) down-converting a signal received through an array antenna to generate a digital signal; b) injecting an RF reference signal into a multi-channel down-conversion unit and to generate a baseband digital reference signal and analyzing the baseband digital reference signal to estimate a transfer function of the multi-channel down-conversion unit; c) correcting an error of the transfer function of multi-channel down-conversion unit based on the transfer function estimate obtained at step b); d) dividing a sector in which the signal is received into a plurality of the subsectors; e) spatial-filtering the digital signal using a beamforming weight to thereby generate a spatial-filtered digital signal; f) correlating the spatial-filtered digital signal with a PN code to thereby detect the signal; and g) estimating an angle range of the signal using an angle region of the subsector in which the signal is detected.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Other objects and aspects of the invention will become apparent from the following description of the embodiments with reference to the accompanying drawings.

Figure 1:
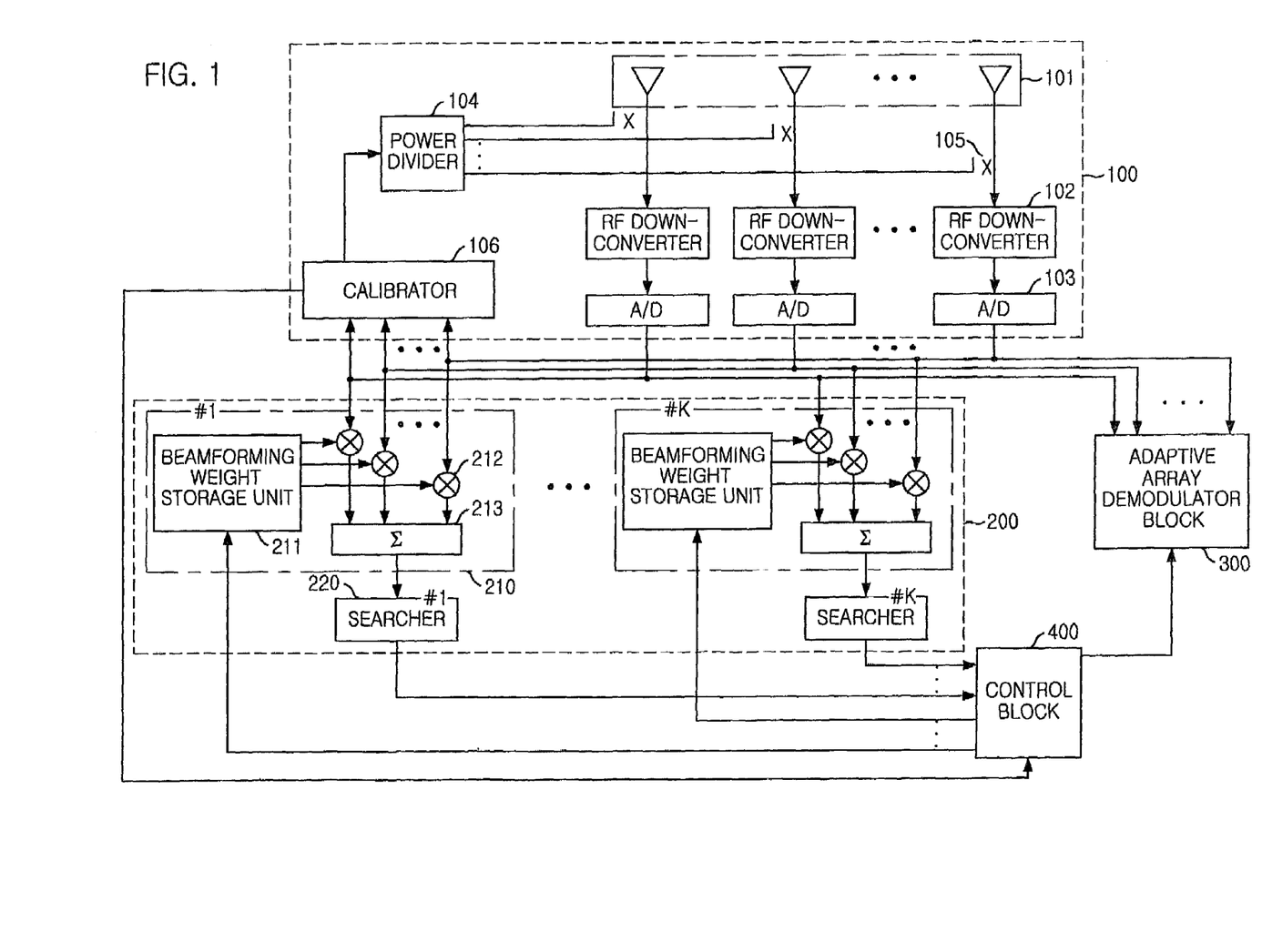
FIG. 1 is a schematic diagram illustrating an apparatus for acquiring a code timing and the range of signal arrival angles in a CDMA base station system in accordance with an embodiment of the present invention.

FIG. 1 is a schematic diagram illustrating an apparatus for acquiring a code timing and a range of signal arrival angles using an array antenna of a CDMA base station system in accordance with the present invention.

Referring to FIG. 1, the apparatus according to the present invention comprises an array receiver block 100, a two-dimensional searcher block 200, an adaptive array demodulator block 300 and a control block 400.

The array receiver block 100 includes array antennas 101, RF down-converters 102, analog-to-digital converters 103, a power divider 104, couplers 105 and a calibrator 106. The two-dimensional searcher block 200 includes a plurality of searcher beamforming networks 210 and searchers 220. Each of the searcher beamforming networks has a beamforming weight storage unit 211, multipliers 212 and an adder 213.

The array receiver block 100 down-converts a signal received through the array antenna 101 into a baseband signal to generate a digital signal.

The calibrator 106 estimates a transfer function of the RF down-converters 102 to provide the transfer function estimation to the control block 400. The transfer function estimate is updated according to the state of the automatic gain control unit in the array receiver block 100 and circumstances such as temperature, humidity and the like.

That is, the calibrator 106 generates an RF reference signal and injects the RF reference signal into the RF down-converter 102 via the power divider 104 and the coupler 105. The digital reference signal outputted from the analog-to-digital converter 103 is sent to the calibrator 106 again to be used for estimating the transfer function of the RF down-converter 102.

The control block 400 stores an optimum beamforming weight of the array antenna 101, which is previously calculated from the array manifold of array antenna 101. The control block 400 transmits a beamforming weight obtained by multiplying the optimum beamforming weight by the inverse of the estimated transfer function, as expressed in the equation 1, to the beamforming weight storage unit 211. Therefore, even when a characteristic of the transfer function of the RF down-converter 102 is changed, a desired antenna beam can be obtained.

$$w_i = H_r^{-1} w_{i,0} \quad \text{(Eq. 1)}$$

where, $w_i$ is a beamforming weight steering i-th subsector angle region;

$w_{i,0}$ is an optimum beamforming weight in case where only the array antenna characteristic is considered; and $H_r^{-1}$ is a diagonal matrix whose diagonal elements represent the inverse of the estimated transfer function of the RF down-converter 102.

The searcher beamforming network 210 performs a spatial-filtering for eliminating in advance interference signals incoming from other subsectors. The searcher 220 correlates the spatial-filtered input signal with a PN code by using an active correlator or a matched filter to detect the signals coming in. If the correlation value is greater than the threshold value, the searcher 220 outputs code timings of the detected signal for the corresponding subsector.

The control block 400 controls the searcher beamforming network 210 to adjust a direction of the antenna beam, and puts together the code timings outputted from the searchers 220 for all subsectors to thereby acquire the code timings of the detected signals of the entire sector. Also, the control block 400 can estimate the range of arrival angles of the detected signals by using the subsector angle region in which the signals are detected. At this time, as the antenna beamwidth formed by the searcher beamforming network 210 becomes narrower, the range of the signal arrival angles becomes closer to an actual arrival angle. The acquired code timings and the range of the signal arrival angles are sent to the adaptive array demodulator block 300. The adaptive array demodulator block 300 performs the finger beamforming, tracks the code timing and demodulates the received signal through a despreader and a rake receiver.

The two-dimensional searcher according to the present invention is provided with the searcher beamforming network 210 coupled to the one-dimensional searcher 220. The two-dimensional searcher 200 performs the spatial-filtering to the signal received from the array receiver block 100 to reduce an interference signal and then acquires the code timing by using the one-dimensional searcher 220. Therefore, even when the signal to interference plus noise ratio of the received signal is small, the code timing can be acquired stably.

In FIG. 1, a reference symbol K represents the number of the searcher beamforming networks 210. In case that one searcher beamforming network 210 is allocated to one sector, the hardware complexity will be reduced, but since all the angles of the sector should be scanned, it takes much time to scan the entire sector with the narrow antenna beam.

On the contrary, in case of the two-dimensional searcher having a parallel structure in which the sector is divided into several subsectors and the searcher beamforming networks 210 are allocated to each subsector, the code timing acquisition time will be shorten and the spatial-filtering performance can be maintained as it is.

Figure 2:
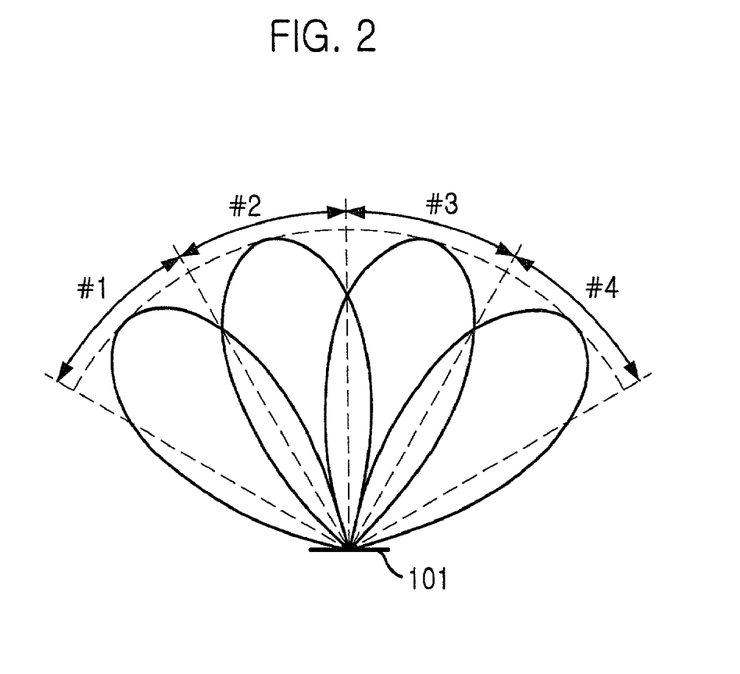
FIG. 2 illustrates four antenna patterns each of whose beamwidth covers each subsector when an entire sector is divided into four subsectors.

FIG. 2 illustrates four antenna patterns each of whose beamwidth covers respective subsectors when one sector is divided into four subsectors. Compared with a prior art of one-dimensional searching, since the antenna beamwidth of the searcher beamforming networks 210 is a fourth (¼) time as narrow as the sector angle, the spatial-filtering function becomes four times. Since four searcher beamforming networks 210 and four one-dimensional searchers 220 are used, the hardware becomes four times as complex as the prior art. The code acquisition time of the present invention, however, is the same as that of the prior art.

Figure 3:
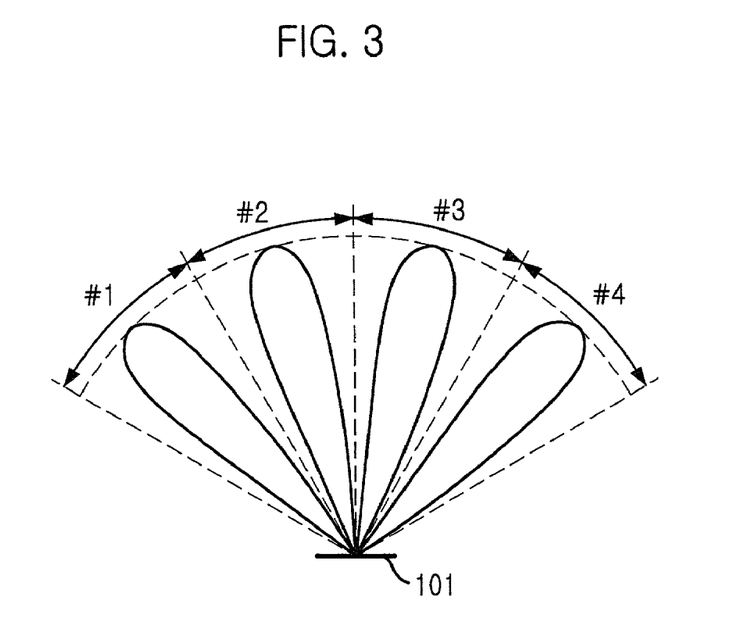
FIG. 3 illustrates an example of the two-dimensional searching when two multipath signals are present.
Figure 3A:
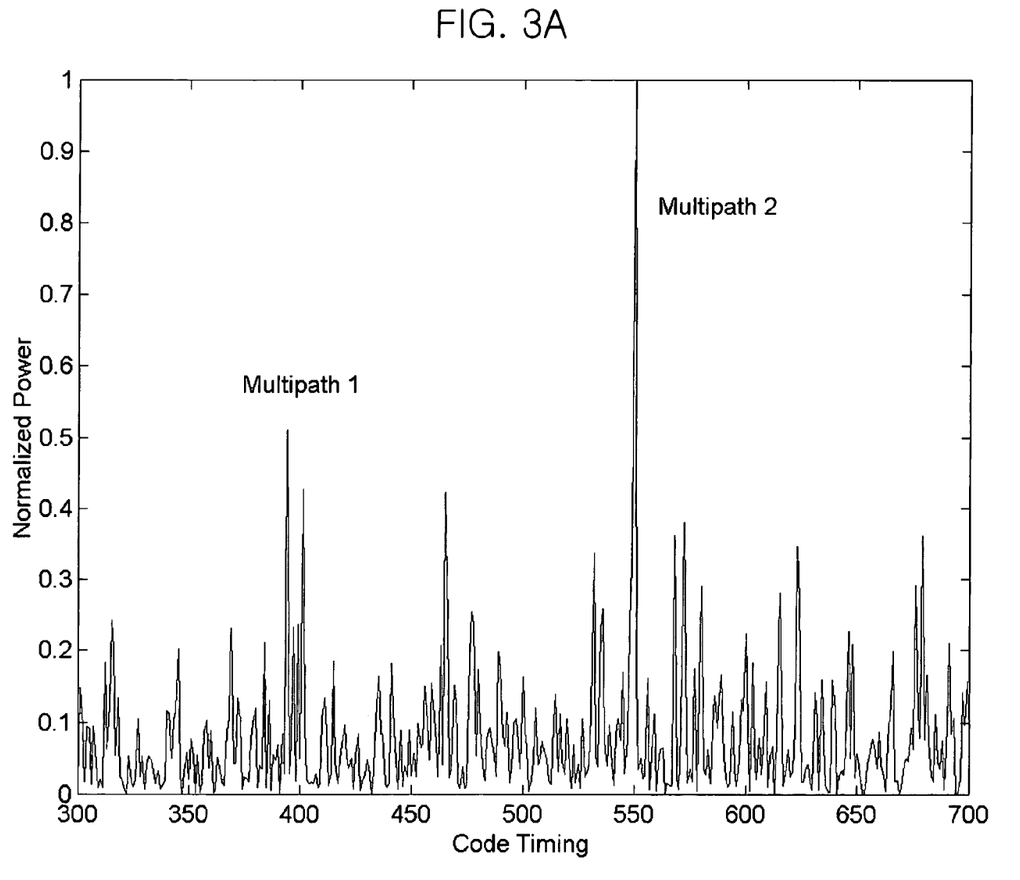
Figure 3B:
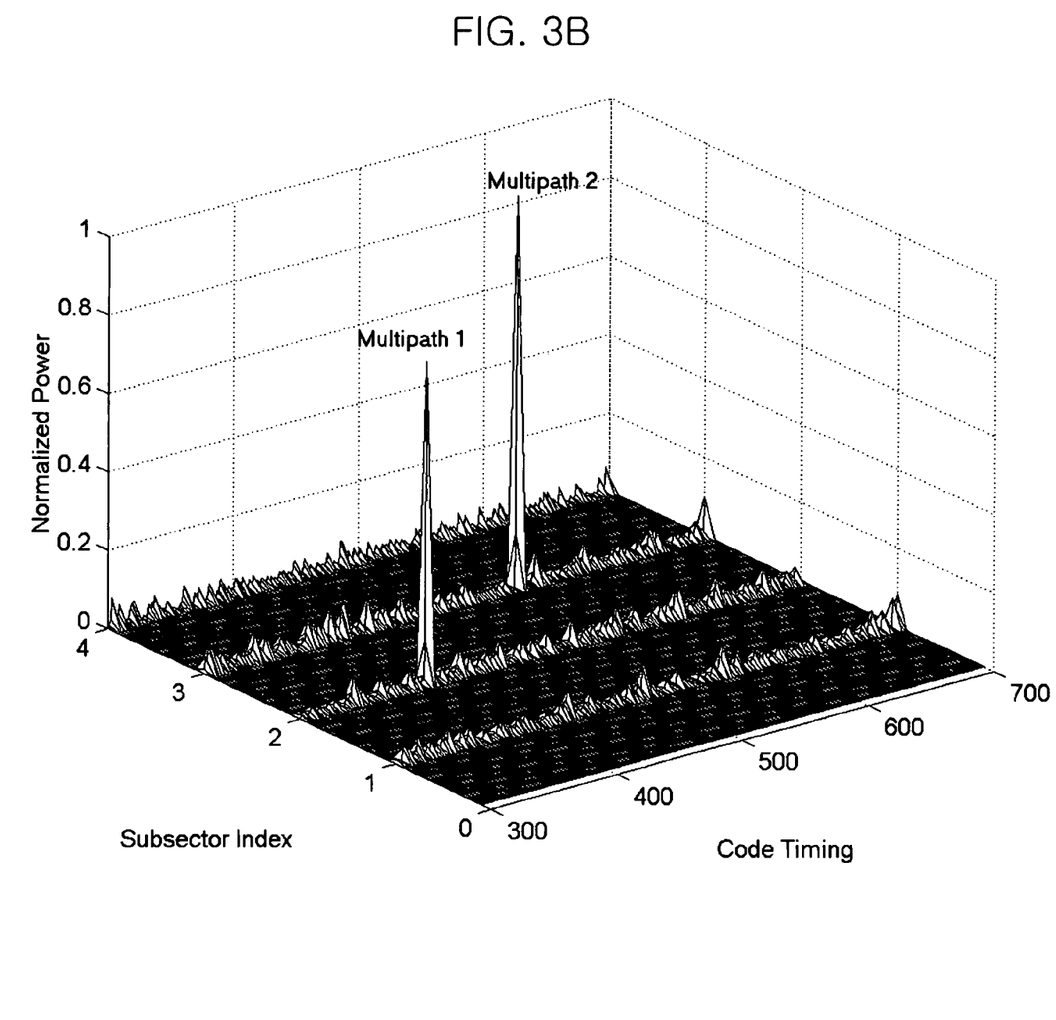

FIG. 3 illustrates the method of two-dimensional searching when a sector is divided into four subsectors as shown in FIG. 2. It is assumed that two multipath signals are coming into the base station. The first multipath signal comes from −20 degree from the broadside direction with 400 PN code offset and the second multipath signal +20 degree from the broadside direction with 550 code offset. FIG. 3A shows the one-dimensional searching result, where it is hard to detect the two multipath signals due to the high sidelobe level due to the low signal to interference plus noise ratio. FIG. 3B shows the two-dimensional searching result, where the two multipath signals can be easily detected. The arrival angle range of the detected signals as well as the code timing (or code offset) can be estimated from the two-dimensional searching result. The arrival angle range of the first multipath signal is the second subsector angle (−30°~0°) and the arrival angle range of the second multipath signal is the third subsector angle (0°~30°).

Figure 4:
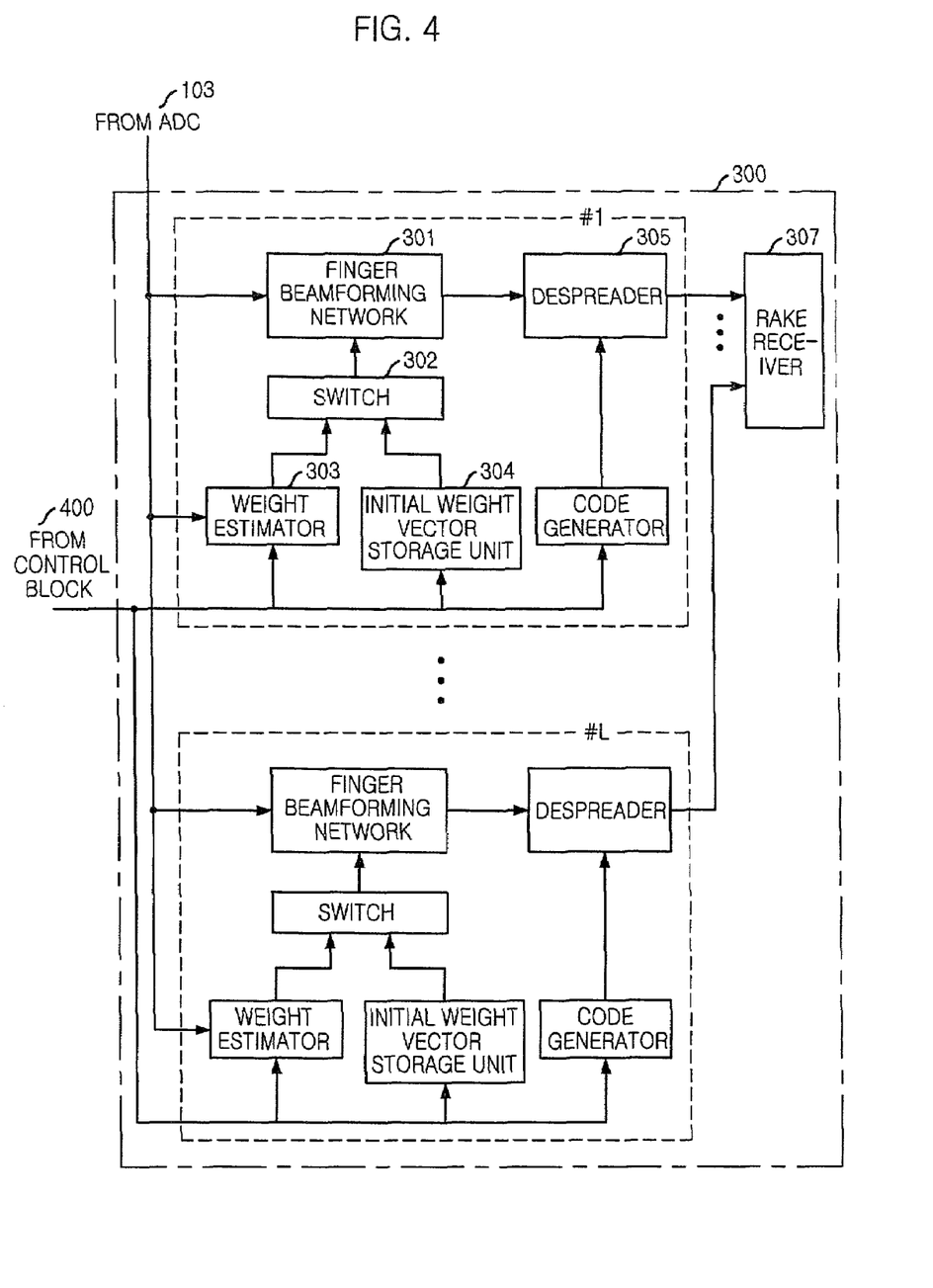
FIG. 4 is a block diagram illustrating the adaptive array demodulator block 300 that performs a beamforming operation before a despreading operation in accordance with an embodiment of the present invention.

FIG. 4 is a block diagram illustrating the adaptive array demodulator block 300 in accordance with an embodiment of the present invention. Referring to FIG. 4, after carrying out a beamforming operation, the adaptive array demodulator block 300 performs a despreading operation and adds coherently the finger output signals by using the rake receiver. A weight estimator 303 estimates the beamforming weight by using an angle of arrival estimation algorithms or an adaptive beamforming algorithm, and transfers the estimated beamforming weight to a finger beamforming network 301. A code generator 306 receives the PN code timing from the control block 400 and tracks the code timing to generate the PN code. Generally, the beamforming algorithms used in the weight estimator 303 require code timing information for calculating the beamforming weight.

Figure 5:
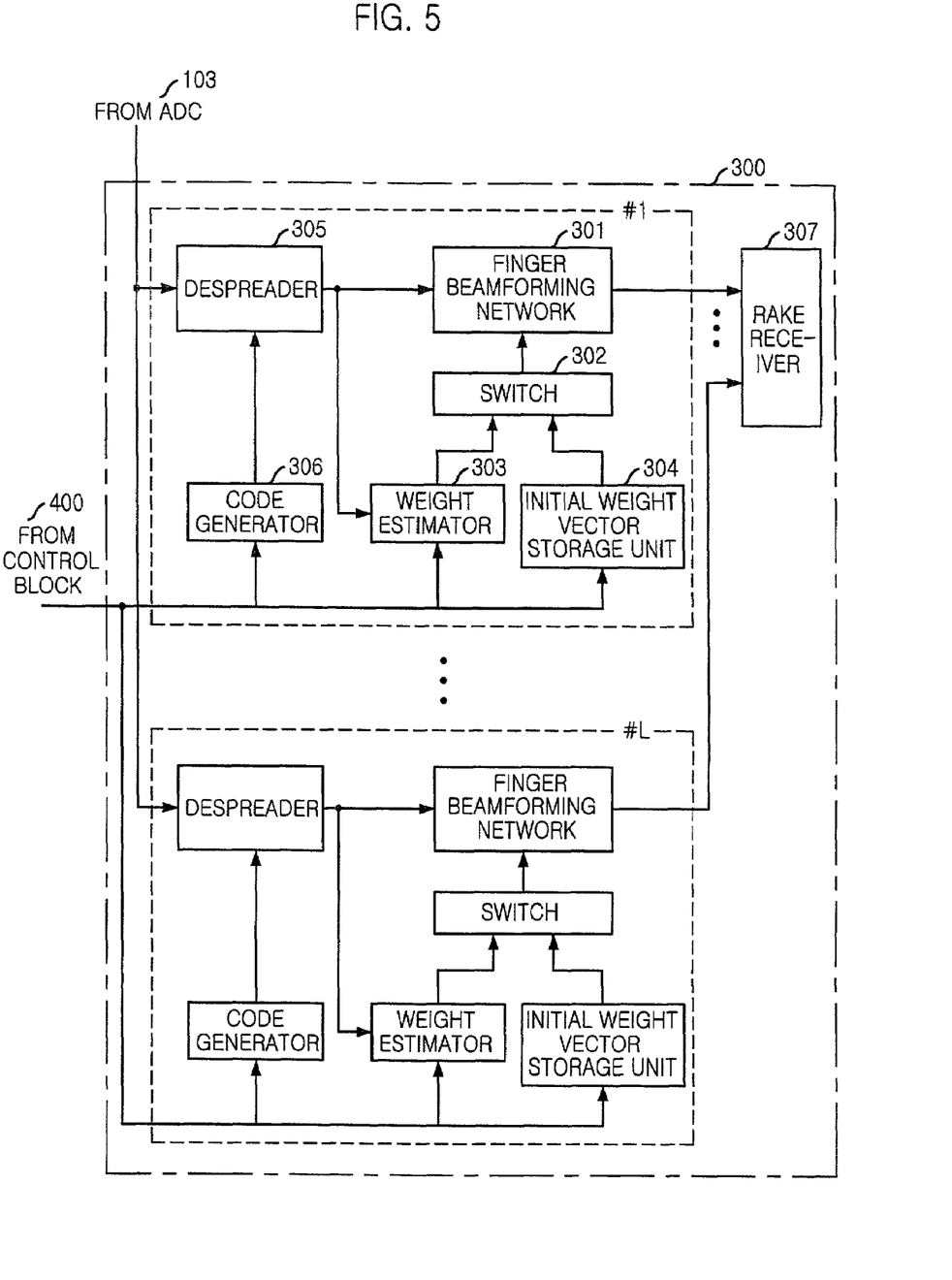
FIG. 5 is a block diagram illustrating the adaptive array demodulator block 300 that performs a beamforming operation after the despreading operation in accordance with an embodiment of the present invention.

FIG. 5 is a block diagram illustrating the adaptive array demodulator block 300 in accordance with an embodiment of the present invention. Referred to FIG. 5, after a despreading operation, the adaptive array demodulator block 300 performs the beamforming operation and adds coherently the finger output signals by using the rake receiver. The weight estimator 303 estimates the beamforming weights using the arrival angle estimation algorithm or the adaptive signal processing algorithm, and transfers the estimated beamforming weight to the finger beamforming network 301. The code generator 306 receives the PN code timing from the control block 400 and tracks the code timing to generate the PN code. Since the weight estimator 303 estimates the beamforming weight using the data outputted from the despreader, it require accurate code timing information.

The two-dimensional searcher presented in this invention has two advantages of increasing the performance of a finger beamformer. One is the reduction of the beamforming weight convergence time for the adaptive beamforming algorithms, and the other is the reduction of computation for the angle of arrival estimation algorithms using the azimuth signal power spectrum.

Hereinafter, the reduction of convergence time is described. In FIGS. 4 and 5, the weight estimator 303 calculates the beamforming weight using the code timing. Therefore, since the finger beamforming weight cannot be obtained until the optimum finger beamforming weight vector is outputted from a point when the code timing is acquired, it is impossible to obtain the finger beamforming. In accordance with the present invention, the searcher beamforming weight corresponding to the range of signal arrival angles is transmitted to an initial weight storage unit 304. The searcher beamforming weight is used as the finger beamforming weight while the weight estimator 303 estimates the optimum beamforming weight. Although the searcher beamforming weight is not the optimum beamforming weight, the interference signal can be eliminated through the spatial-filtering operation.

Methods of using searcher beamforming weight as initial finger beamforming weight have the effect of reducing the convergence time in the adaptive beamforming algorithms such as a normalized least squares (NLMS) and a recursive least squares (RLS). An example of the embodiment of the present invention is described for the NLMS adaptive beamforming algorithms with reference to the equation (2). The NLMS obtains the optimum finger beamforming weight by setting an initial weight to an arbitrary value and sequentially updating the beamforming weight.

$$w(k+1) = w(k) + \frac{\mu}{a + x^H(k)x(k)} x(k)[d(k) - w^H(k)x(k)]^* \quad \text{(Eq. 2)}$$

where, k is a time index, w(k) and x(k) denote a k-th beamforming weight column vector and a k-th received signal sample column vector, respectively, d(k) denotes a k-th sample of the beamforming reference signal, which can be PN code and/or decision-directed bit in the CDMA communication system.

$\mu$ and $\alpha$ are constants.

In the NLMS algorithm, the convergence speed of the beamforming weight is determined by the initial weight vector, w(1) as well as the constants $\mu$ and $\alpha$. That is, as the initial weight vector becomes similar to the optimum beamforming weight, the convergence speed becomes faster. Accordingly, since the searcher beamforming weight which has a large gain in the direction of the desired user is used as the initial finger beamforming weight, the convergence speed of the NLMS algorithm will be increased. Especially, if the NLMS algorithm uses a decision-directed bit as a beamforming reference signal, d(k), the error in the initial decision-directed bit will have much impact on the convergence speed. By using the searcher beamforming weight as initial finger beamforming weight, the error rate of the decision-directed bit will be reduced.

Hereinafter, the reduction of computation for the angle of arrival estimation algorithms using the azimuth power spectrum is described by an example for the vector correlation technique with reference to the equation (3).

An array antenna response column vector b(θ) of a specific user is calculated and then correlated with an array antenna response vectors, a(θ) to obtain an azimuth power spectrum.

$$P_{VC}(\theta) = |b(\theta)^H a(\theta)|^2 \quad \text{(Eq. 3)}$$

where, azimuth power spectrum, $P_{VC}(\theta)$ represents the received signal power when the beamformer steers a direction of angle, θ. Azimuth power spectrum can be averaged for the duration much longer than the channel coherence time to accommodate the angle spread in the propagation channel. Thereafter, the arrival angle is estimated by finding out the angle corresponding to the maximum azimuth power value or comparing with the threshold value.

Accordingly, if there is no information on the range of the signal arrival angles, the azimuth power value should be calculated for all angles of the sector. However, if the range of the signal arrival angles is previously known from the two-dimensional searcher block 200 according to the present invention, the azimuth power spectrum only for the specific angle range is enough to estimate the arrival of angles, so that an amount of computation is reduced.

As mentioned above, even when the signal to interference plus noise ration at the received signal is low, the code timing can be obtained stably using the two-dimensional searcher. Furthermore, the two-dimensional searcher can be used to increase the performance of a finger beamformer in two ways. One is to use searcher beamforming weight as initial finger beamforming weight for reducing the convergence time in the adaptive beamforming algorithms. And the other is to reduce the computation in the angle of arrival estimation algorithms by calculating the azimuth power spectrum only for the specific angle range.

Although the preferred embodiments of the invention have been disclosed for illustrative purposes, those skills in the art will appreciate that various modifications, additions and substitutions are possible, without departing from the scope and spirit of the invention as disclosed in the accompanying claims.

What is claimed is:

1. A code division multiple access (CDMA) base station system, comprising:
    an array antenna receiving a signal;
    a multi-channel down-conversion means for down-converting the signal received through the array antenna to generate a digital signal;
    a calibration means for injecting an RF reference signal into the multi-channel down-conversion means to generate a baseband digital reference signal, analyzing the baseband digital reference signal to estimate a transfer function of the multi-channel down-conversion means and correcting an error of the transfer function of multi-channel down-conversion means;
    a two-dimensional searching means for spatial-filtering the digital signal to generate a spatial-filtered signal and correlating the spatial-filtered digital signal with a pseudo noise (PN) to thereby detect the signal and acquire corresponding code timings; and
    an adaptive array demodulation means for performing a beamforming operation and demodulating received data through a despreader and a rake receiver.

2. The code division multiple access (CDMA) base station system as recited in claim 1, wherein said two-dimensional searching means includes:
    means for dividing a sector into a plurality of subsectors;
    a plurality of beamforming networks each for spatial-filtering the digital signal by forming an antenna beam steering the corresponding subsector; and
    a plurality of one-dimensional searchers each for correlating the spatial-filtered signal with the PN code to detect the signals coming from the direction of the corresponding subsector and to acquire the code timings of the detected signals,
    wherein the beamforming network and the one-dimensional searcher are allocated to each subsector, and
    wherein all the code timings outputted from the subsectors are put together to thereby acquire the code timings for the sector.

3. A method for acquiring a code timing by using a two-dimensional searcher in a code division multiple access (CDMA) base station system using an array antenna, comprising the steps of:
    a) down-converting a signal received through an array antenna to generate a digital signal;
    b) injecting an RF reference signal into a multi-channel down-conversion means and to generate a baseband digital reference signal and analyzing the baseband digital reference signal to estimate a transfer function of the multi-channel down-conversion means;
    c) correcting an error of the transfer function of multi-channel down-conversion means based on the transfer function estimate obtained at step b);
    d) dividing a sector into a plurality of the subsectors;
    e) spatial-filtering the digital signal using a beamforming weight to thereby generate a spatial-filtered digital signal;
    f) correlating the spatial-filtered digital signal with a PN code to thereby detect the signal and acquire code timings of the detected signal; and
    g) putting together the code timings for all the subsectors to acquire the code timings for an entire sector.

4. A method for estimating a range of a signal arrival angle using a two-dimensional searcher in a code division multiple access (CDMA) base station system having an array antenna, comprising the steps of:
    a) down-converting a signal received through an array antenna to generate a digital signal;
    b) injecting an RF reference signal into a multi-channel down-conversion means and to generate a baseband digital reference signal and analyzing the baseband digital reference signal to estimate a transfer function of the multi-channel down-conversion means;
    c) correcting an error of the transfer function of multi-channel down-conversion means based on the transfer function estimate obtained at step b);
    d) dividing a sector in which the signal is received into a plurality of the subsectors;
    e) spatial-filtering the digital signal using a beamforming weight to thereby generate a spatial-filtered digital signal;
    f) correlating the spatial-filtered digital signal with a PN code to thereby detect the signal; and
    g) estimating an angle range of the signal using an angle region of the subsector in which the signal is detected.

5. The method as recited in claim 4, further comprising the step of:
    estimating an angle of arrival of the signal based on an azimuth power spectrum calculated only within the angle range obtained at step g).

6. The method as recited in claim 4, wherein the error of the transfer function of multi-channel down-conversion means is corrected based on the transfer function estimate obtained at step b).

7. The method as recited in claim 4, wherein the error of the transfer function of multi-channel down-conversion means is corrected by multiplying an optimum beamforming weight of the array antenna by an inverse of the transfer function estimate, wherein the optimum beamforming weight is calculated from the array manifold of the array antenna.

8. The method as recited in claim 7, wherein a finger beamforming is performed until the optimum finger beamforming weight is calculated, wherein the searcher beamforming weight steering the subsector in which the finger signal is detected is used as an initial finger beamforming weight.

9. The method as recited in claim 8, wherein the convergence speed of finger beamforming weight is increased, wherein the beamforming weight steering the subsector in which the finger signal is detected is used as an initial finger beamforming weight.

* * * * *